Feb. 27, 1962 — G. DIRKS — 3,022,950
ELECTRONIC COMPUTING MEANS
Filed Oct. 22, 1956 — 10 Sheets-Sheet 2

Inventor
Gerhard Dirks
By Shoemaker & Mattare
Attys

Feb. 27, 1962 G. DIRKS 3,022,950
ELECTRONIC COMPUTING MEANS
Filed Oct. 22, 1956 10 Sheets-Sheet 4

Inventor
Gerhard Dirks
By Shoemaker & Mattare
Attys

Feb. 27, 1962  G. DIRKS  3,022,950
ELECTRONIC COMPUTING MEANS
Filed Oct. 22, 1956  10 Sheets-Sheet 5

Inventor
Gerhard Dirks

By *Shoemaker & Mattare*
Attys

Inventor
Gerhard Dirks

By Shoemaker & Mattare

Attys

Inventor
Gerhard Dirks

Feb. 27, 1962 G. DIRKS 3,022,950
ELECTRONIC COMPUTING MEANS
Filed Oct. 22, 1956 10 Sheets-Sheet 8

Inventor
Gerhard Dirks
By Shoemaker & Mattare
Attys

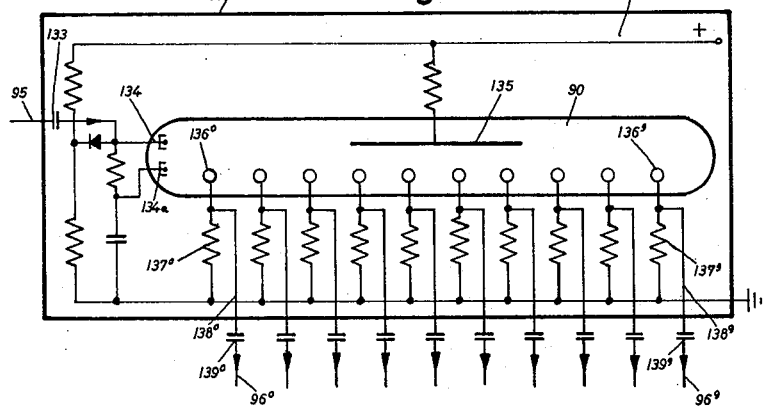
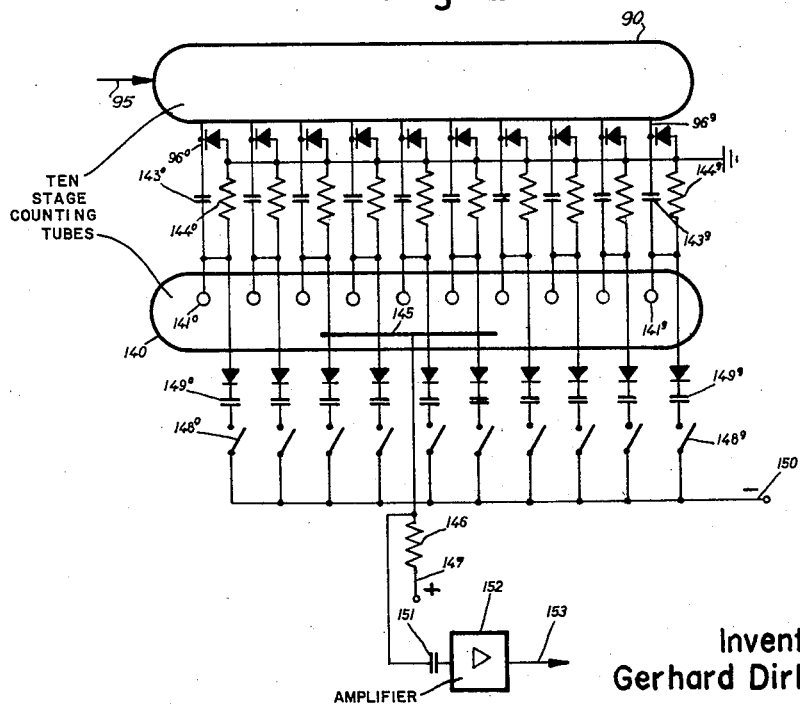

United States Patent Office 3,022,950
Patented Feb. 27, 1962

3,022,950
ELECTRONIC COMPUTING MEANS
Gerhard Dirks, 44 Morfelder Landstrasse, Frankfurt am Main, Germany
Filed Oct. 22, 1956, Ser. No. 617,523
Claims priority, application Great Britain Oct. 21, 1955
9 Claims. (Cl. 235—153)

This invention is concerned with electronic computing means, one use of which could be for multiplying or dividing, or combined multiplication and division operations.

One object of the invention is to provide a computing apparatus in which at each denomination-wise operation of an input key, switch or the like, the result in the corresponding denomination is instantly given, and may be stored or printed directly or otherwise used.

Another object of the invention is to provide computing apparatus which will multiply and/or divide for example according to the formula $$\frac{a \times b + c}{d}$$

or any partial computation thereof, in each case giving a quotient and a remainder. One example of the use of this formula, using the remainder, is in the production of check symbols based on prime numbers, that is to say check symbols comprising digits or other characters to be attached to the end of a group of other symbols (e.g. at the end of a number) so that the accuracy of the number or other symbol group can be determined at any time by comparing said check symbol with the result of a mathematical process worked on said other symbols. In such a case the remainder from the computation is used as the check symbol.

The apparatus may be illustrated first with reference to the producing of check symbols which are derived by taking the successive digits of a number, beginning with the highest denomination, multiplying each digit by a constant, and adding to that product the digit in the next lower denomination, dividing the total by a selected prime number, then multiplying the remainder by the same constant, adding the digit from the next lower denomination and again dividing by the selected prime number, and so on until there is a final remainder, which constitutes the check symbol required.

For example, taking the number 2483 the arithmetical process for arriving at a check symbol could be as follows:

$$2 \times 10 = 20$$
$$\text{add } 4 = 24$$
$$\text{divide by } 13 = 1 \text{ and remainder } 11$$
$$11 \times 10 = 110$$
$$\text{add } 8 = 118$$
$$\text{divide by } 13 = 9 \text{ and remainder } 1$$
$$1 \times 10 = 10$$
$$\text{add } 3 = 13$$
$$\text{divide by } 13 = 1 \text{ and remainder } 0$$

Therefore the check symbol is 0 and the complete number would be written 24830.

Mechanical devices for the obtaining of these check symbols are impossible commercially because of the great complications involved, because of the cost that would be entailed and because of the relatively low speed at which they would work.

According to the invention, a computing unit comprises a control storage for signals, pulse trains or the like, a multiple signal control unit for providing a controlled series of signals, pulses or the like, and a final counter counting in an order other than 10 or binary, and comprises also control means whereby such counter receives a number of signals from the said control unit determined by the said control storage so as to produce signals representing a result, for example a quotient with a remainder as a count in the final counter.

The arrangement may be characterised in that the final counter is an electric counter with a capacity which is the said prime number on which the check symbol is based, or is a multiple thereof.

According to another feature of the invention, the counter may be of a bi-stable type wherein the bi-stable elements are connected to counting chains with a total capacity of the order required for any sub-division of pulses.

According to another feature of the invention, there is provided a pulse-counting means for counting in orders other than the decimal and binary orders (for which excluded orders electronic counting tubes are already available) wherein there is at least one tube with multi-stage conditions, and so many single-stage tubes (or other electronic control elements) as together make up the desired order of stages, and wherein there is means whereby counting continues from the starting value through all the tubes or the like in sequence before returning to the starting value.

Conveniently, the multi-stage tubes may be ten-stage tubes and there may be one, two or more of such ten-stage tubes. In fact there may be as many ten-stage tubes as there are decades in the order in which the counting is being done. That is to say, for counting in the order 27 there would be two ten-stage tubes and seven single-stage tubes, or there could be five five-stage tubes and two single-stage tubes.

In a modification, the counting could begin with one of the single-stage tubes, then proceed to the next and then to the third and from the third into the multi-stage tube again switching back to zero on reaching the full count of 13.

A reverse counting may be employed in some cases. For instance, in the example quoted the starting value could be 13, and the counting be effected by diminishing to zero.

According to a further feature of the invention, a pulse-counting means is characterised in that counting takes place through some only of the stages of a multi-stage tube before returning to the starting value. The number of stages used is variable in dependence on adjustable control means effecting their operative capacity.

In the more usual forms of the invention there will be one or more multi-stage tubes in which counting takes place through all the stages, and a further multi-stage tube in which counting takes place through some only of the stages, all the tubes returning to the starting value after completion of said some stages in the further tube, and without regard to any unused capacity of such further tube. Counting may take place by increasing from zero to a maximum, or by diminishing from a maximum to zero.

Said two or more tubes will operate in sequence and will have carry-over means between them, the counting terminating upon the attainment of predetermined values in the respective tubes. For example, in counting in the order 91, two multi-stage tubes could be used and counting could be terminated when in the one tube the value was 9 and in the other tube the value was 1, the tubes automatically returning to zero, or to "1" on receiving the 92nd impulse. Counting may begin at zero and return to zero on attainment of a predetermined value, or the tubes may be given a predetermined starting value and return to that value after diminishing to zero.

There may be a comparing device effective to return the tube or tubes to the starting value on the attainment of the predetermined count and such comparing device may operate by comparing voltages and/or currents corresponding to the predetermined count. There may be direct switching circuits or output circuits from the tube or tubes, at least at the predetermined maximum count, and there may be means for supplying to the tube or tubes a constant voltage corresponding to the predetermined maximum count.

According to another feature of the invention, additional pulses are supplied to the tube or tubes in which only some of the stages are used, for adding or subtracting effects, and these additional pulses are counted in another counting means and/or other control means are influenced by them, until the attainment of zero or of the predetermined maximum as the case may be.

The attainment of zero or of the predetermined count may be effective to control mechanical means operating at a reduced rate relatively to the pulse timing but in synchronism with the pulse timing, the ratio of said reduction being in dependence on the order of the maximum count.

In another arrangement the attainment of zero or of a predetermined count is effective to control electro-mechanical means for the same purpose. Such means may be used to indicate the extent of the count at any time.

The pulse counters may be used for example for counting the number of units of width of type in type-setting machines, compositors and the like, and may be used to indicate the total width of the assembled type at any time in the making up of the line.

There may be a mechanical or other indication for example by electric lamps indicating the extent to which the line of type is made up at any time.

When used in conjunction with a keyboard, as in a type-composing or like machine, depressions of a space key are counted independently of the depressions of the other keys, and such space key countings may control the same indicating means or other indicating means operating in the opposite direction, for indicating the actual line length as it is made up.

With any such arrangement of counter or counters, the completion of a line may release control signals effective to operate line-changing means for the beginning of the next line. Also, the extent of making-up of a line may be indicated by voltages and/or currents in dependence on the counter; that is to say, a voltmeter or ammeter may be calibrated in terms of type width.

The counting arrangement of this invention may be used to operate error-detecting means using check symbols in other than the binary or decimal systems. Attainment of zero or of a predetermined maximum count may be effective to release control signals determining the operation or non-operation of apparatus being checked by said error-detecting means.

The maximum count may be varied selectively for counting in other orders. That is to say, an apparatus counting say in the order of 13 may, when necessary, be adjusted or varied so as to count say in the order 91, or in any other order.

An assembly of tubes may have different orders of count say for use with the British monetary system, or British systems of weight and volume, to carry over at different values, and the assembly may be convertible from one such system to another.

The carry over may be effected at different counts in dependence on commands for instance from means co-ordinated to a co-operation between an erasable storage means and a serial adder. For such purpose a distributor may be employed determining at which count the carry is to be effected and determining the co-ordinated order of the number.

In some forms of the invention, the control storage controls the number of series of signals to be delivered from the multiple signal generator to the said counter and such number of series of signals to be delivered to the counter may be controlled in dependence on the number stored in the control storage or, in some cases, it may equal the number stored in the control storage.

According to another feature of the invention, the control storage receives a series-indicating signal from the multiple signal control unit when a new series of signals begins or ends. Such series-indicating signal may be counted in an electric counter.

According to yet another feature of the invention, a comparison is effected between the number of such series-indicating signals and the number in the control storage which was to control the operation of the multiple-signal control unit and, in the event of an equal comparison, a control signal terminates further delivery of signals from such control unit. The counting and comparison may be done within the same counter in which the storing of the control signals is effected in one direction and the series-indicating signals are effected in an opposite direction and, when zero is reached, a control signal terminates further delivery of signals from the said control unit. A complement may be stored and the required number obtained by adding to zero, or the number itself may be stored and be counted back to zero in a subtractive way.

Alternatively, the control storage may store pulses by means of bi-stable elements connected to counting chains, or by means of bi-stable elements for combination signals. The multiple signal control unit may comprise a continuously operating signal generator proper and at least one gating means allowing delivery of determined pulse sequences to the final counter under the control of signals in the storage, and such gating means may be under the control of a pulse counter allowing the transfer of signals through the gate in a number equal to a predetermined order of count building up a series of signals.

The arrangement may be such that the gate allows the delivery of at least one series of combination signals of selected combination type in a controllable number.

The signal generator may comprise an electronic multi-stage counter and means may be provided to add into the final counter columnwise the signals for the characters to be checked.

Furthermore, so many pulses may be put into a final counter as are co-ordinated to the number to be checked or a number of pulses may be fed into the final counter which is equal in number to the number to be checked.

Characters may be represented by combination signals and such combination signals are delivered to the final counter by a decoding means, and such decoding means, and such decoding means may be of the type described in my co-pending application No. 617,525, now Patent No. 2,840,209, filed 22nd October 1956.

The combination signals by which the characters are represented may be of a type adapted for direct counting in the final counter and signals representing controls may be put into the final counter.

There may be exchangeable means for varying the co-ordination between the characters and the signals representing them, and switching means may be provided for a selective variation of the order of the final count. Such switching means may be for example as set forth in the above-mentioned co-pending application.

In order that the present invention may be readily carried into effect, it will now be described with reference to the accompanying drawings, wherein:

FIG. 11 is a circuit diagram of a ten-stage counting tube;

FIG. 12 is a circuit diagram of a pre-setting arrangement for a ten-stage counting tube.

One mode of operating the invention will now be described with reference to the accompanying schematic drawing, wherein the four FIGS. 1a–1d represent four successive stages in the operation of the unit. The control storage is indicated at 1, the multiple signal control unit is indicated at 2, and the final counter is indicated at 3. Taking the example mentioned in the earlier part of the specification, namely the number "2483" for which a check symbol based on the prime number "13" is to be found, first of all the first digit "2" of such number is fed as signals to the counter 3 as shown in FIG. 1a. This is passed as a remainder to the control storage 1, see FIG. 1b, which then causes the multiple signal control unit 2 to forward two series of ten signals (equivalent to multiplying "2" by "10") to counter 3. Signals representing the next digit "4" of the number are also fed into counter 3. This total of "24" is counted in the scale of "13," and the remainder "11" is passed back to the control storage 1 as shown in FIG. 1c. Thereupon the storage 1 causes the control unit 2 to forward eleven series of ten pulses to the final counter to represent "11" multiplied by "10." This product "110" has added to it signals for the next digit "8" of the number and the total "118" is counted in the scale of "13" by the counter 3, a further remainder "1" then being passed back to the storage 1. This now causes the control unit 2 to pass "1"×"10" signals to the final counter, to which are added signals for the last digit "3" of the number. The total "13" is counted by the final counter 3, and produces no remainder, which means that, based on "13," the check symbol for the number "2483" is "0."

Figure 2:
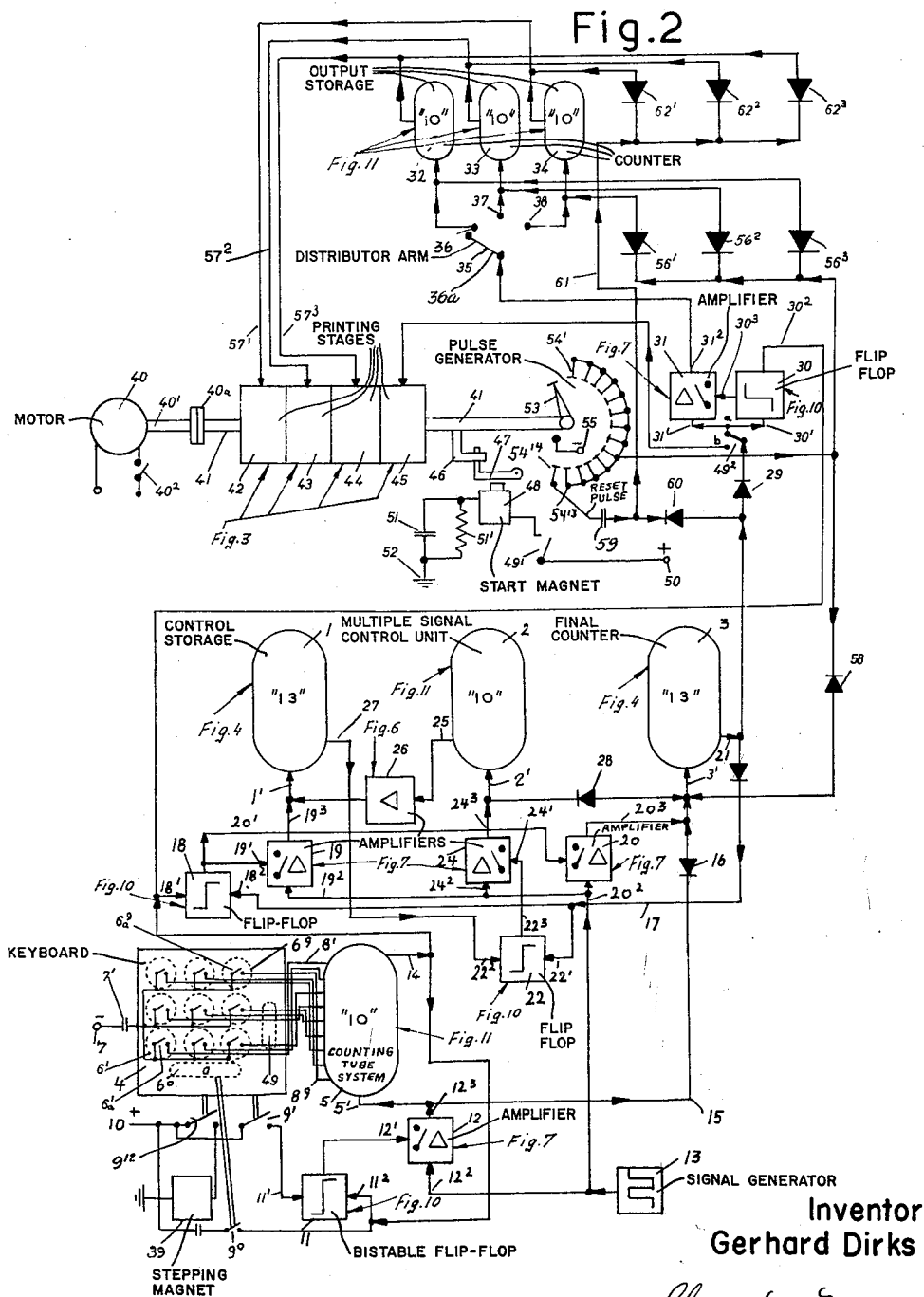
FIG. 2 is a block diagram of an electric computing means with input and output means.

FIG. 2 is a block-diagram of a computing means according to the invention. It allows combined multiplication with addition and division according to the following general computing scheme $$\frac{a \times b + c}{d}$$

and a repetition of such computations with registration of the remainder of the division. The computing example may be the one mentioned above in connection with forming a check symbol.

The computing means is combined with an input means in the form of a keyboard and an output means in the form of a printer.

Figure 1:
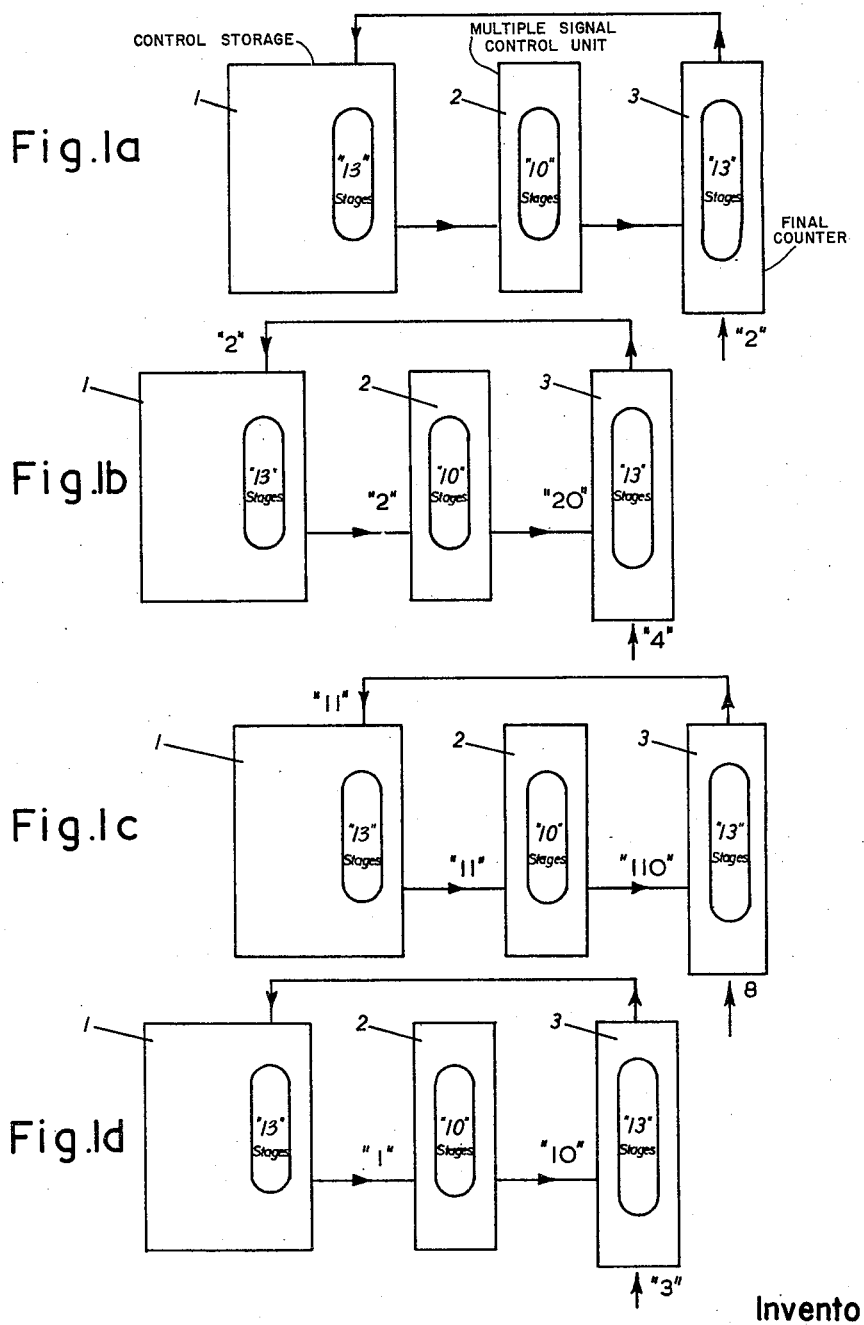
FIGS. 1a–1d are diagrams illustrating successive states in a computation as performed by the embodiment of the invention shown in FIG. 2.

FIG. 2 shows as block diagrams the control storage 1, the multiple signal control unit 2 and the final counter 3, comparably to FIG. 1. It shows furthermore the keyboard 4 as input means and the printing stages 42 to 44 as output means as described above.

The keyboard 4 of FIG. 2 is formed as a keyboard with ten keys $6^{0-9}$. Said keys operate digit value contacts $6a^{1-9}$ which each provide a circuit from the negative pole 7 through a capacitor 7' to corresponding leads $8^{1-9}$ which in turn are connected to the counting cathodes of a counting dekatron tube with ten stages in the counting tube system 5. When one of the keys $6^{0-9}$ is depressed, one of the counting cathodes of the dekatron tube system 5 will receive a pulse as determined by the selected key. Each of the digit value contacts $6a^{1-9}$ operated by the keys $6^{1-9}$ is connected to a counting cathode of the "10" stage counting tube system 5 which corresponds to the complement "to ten" of the value represented by the digit key. There is no digit value contact operated by key "0" $6^0$. This key operates only control contacts $9^0$ described later on.

Below each of the keys $6^{1-9}$ are normally open contacts 9 each connected between plus pole 10 and the input lead $11^1$ of flip flop stage 11. Only the contact line 1 operated by the key $6^1$ is shown in FIG. 2. The closing of the circuit from plus pole 10 to lead $11^1$ through an operated contact 9 takes place a short instant after the closing of the digit value contact 6a which actuated the respective counting cathode of counting tube system 5.

This pulse through lead $11^1$ switches bi-stable flip flop stage 11 into its opposite position, thereby making amplifier 12 operative through lead $12^1$. Pulses from signal generator 13 are thereby delivered through lead $12^2$ and the operative amplifier 12 to lead $12^3$ and from there to the input lead $5^1$ of the counting tube system 5. Each pulse in the known way advances the discharge of the counting tube from one counting cathode to the next, until finally the counting cathode representing the digit value "0" will be reached which cathode is connected to output lead 14. Flip flop 11, controlled amplifier 12, signal generator 13 and counting tube system 5 are described in more detail below.

As soon as the counting cathode "0" is reached and a positive pulse is generated at lead 14, this is fed to flip flop 11 through lead $11^2$ and switches said flip flop back to its initial position. The controlled amplifier 12 is thereby made inoperative under control of lead $12^1$ and the pulses from signal generator 13 entering at lead $12^2$ are no more longer supplied to output lead $12^3$ nor through input lead $5^1$ to the counting tube system 5 so that this counting tube system stops with the discharge on the said counting cathode "0."

The same pulses from signal generator 13 through amplifier 12 when it is operative are delivered not only to counting tube system 5 but also through lead 15 and diode 16 to "13" stage counting tube system or final counter 3.

The counting tube system 3 thereby receives a number of pulses which corresponds to the value represented by the depressed key of the keys $6^{1-9}$, as the complementary connections between the digit value contacts 6a below the keys $6^{1-9}$ and the counting cathodes of counting tube system 5 allow operation of amplifier 12 under control of flip flop stage 11 for a time period which corresponds to the number of pulses equal to the value represented by the depressed key of keyboard 4.

Referring now to the computing example already described in which a check symbol is to be computed by a computing process containing multiplication, addition and division for the number "2483" this computing process is described with reference to FIG. 2, in order to show such combined operation of a computing system.

At first a digit "2" of the value "2483" is entered by depressing key "2" ($6^2$) of keyboard 4. The negative pole 7 thereby delivers through the capacitor ($7^1$) a pulse to the eighth counting cathode of the counting tube system 5, as it represents the complementary value to "10" of the digit value "2." This pulse forces the discharge to locate itself on the eighth cathode. An instant afterwards, the closing of the contact $9^2$, which is actuated by the key $6^2$, makes the amplifier 12 operative through the flip flop 11, and after two pulses from signal generator 13 the counting cathode "0" of the counting tube system 5 will be reached.

The pulse delivered through output lead 14 switches over flip flop stage 11 through lead $11^2$ and makes the controlled amplifier 12 inoperative through lead $12^1$. Thus counting tube system 5 has been counted back to "0" whereas counter 3 has received through lead 15 and diode 16 two pulses corresponding to the depressed key $6^2$ of keyboard 4. The discharge in counting tube system 3 has been moved to counting cathode "2" in response to the said two pulses received through lead 15 and diode 16.

In the embodiment shown in FIG. 2 the pulse delivered to the output lead 14 when counting tube system 5 reaches the counting cathode "0" is also fed to flip flop 18 by lead $18^1$ and switches it over to its opposite stable state. Controlled amplifiers 19 and 20 are thereby rendered operative through leads $19^1$ and $20^1$ from the output of flip flop 18. The pulses entering the controlled amplifier 19 at input lead $19^2$ from signal generator 13 are supplied to output lead $19^3$ and from there through the input lead $1^1$ of the "13" stage control storage 1 designed in the form of a counting tube system with thirteen stages.

The controlled amplifier 20 also receives pulses from signal generator 13 through lead $20^2$ which are delivered to output lead $20^3$ when said amplifier 20 is operative. These pulses enter the counting tube system 3 through its input lead $3^1$. As soon as the pulse in lead 14 has switched over flip flop 18 as described above, the pulses from signal generator 13 are delivered through the leads $19^2$ respectively and $20^2$ through the amplifiers 19 and 20 to the output leads $19^3$ and $20^3$ of the amplifiers 19 and 20 to the counting input lead $1^1$ of control storage 1 and to input lead $3^1$ of the thirteen stage final counter 3. The number of pulses which are delivered simultaneously into both counting tube systems 1 and 3 is determined by a pulse produced on lead 21 when counting tube system 3 reaches the counting cathode "0" which is connected through a resistance in the following manner.

As two pulses had been entered into counting tube system 3, and as this counting tube system 3 has in all thirteen operative counting stages, this pulse at output lead 21 will be delivered after eleven more pulses. The same number of pulses from signal generator 13 will be fed to the control storage 1. The pulse at lead 21 enters, through lead $18^2$, the flip flop 18, switches it back and renders inoperative both controlled amplifiers 19 and 20 through leads $19^1$ and $20^1$. Eleven pulses are thereby delivered into counting tube system 1, and as this system started from "0," it is therefore stopped with a registration of "11" whereas counting tube system 3 is stopped in the "0" condition.

The pulse in lead 21 not only enters flip flop 18 through lead $18^2$, but also enters flip flop 22 through lead $22^1$, thereby switching flip flop 22 over to its opposite state and making the controlled amplifier 24 operative under control of lead $24^1$ connected to the output lead $22^3$ of said flip flop 22. When counting tube system 3 has returned to "0" and the digit value which had been stored previously in this counting tube system has been transferred as a complementary value into the control storage tube 1 (in this case the complementary digit value "11" of digit value "2") pulses from signal generator 13 are supplied through lead $24^2$ and the amplifier 24 to its output lead $24^3$ and from there to the input lead $2^1$ of the multiple signal control unit 2 including a "10" stage counting tube. The counting cathode "0" of counting tube system 2 is connected through output lead 25 and amplifier 26 to the input lead $1^1$ of counting tube system 1. As soon as controlled amplifier 24 is made operative under control of flip flop 22 because of a pulse from lead 21, it allows the transfer of pulses from signal generator 13 to counting tube system 2 which counts through all its stages. After each group of ten pulses so counted a pulse is delivered through output lead 25 which advances counting tube system 1 by one step. As in this case, counting tube system 1 was at counting cathode "11" before the new pulses entered at lead $1^1$ from the output lead 25, twenty pulses will have passed from signal generator 13 through the amplifier 24 before counting tube system 1 delivers a pulse through its output lead 27 which is connected to the "0" counting cathode of counting tube system 1. This pulse is fed to flip flop 22 through lead $22^2$ changing it back to its initial condition and rendering inoperative amplifier 24. Both counting tube systems 1 and 2 are at this time instant again in their "0" condition. As output lead $24^3$ is also connected through diode 28 to the input lead $3^1$ of counting tube system 3 the same number of pulses, namely in this case "20," have entered the counting tube system 3. The counting tube system or final counter 3 has, as mentioned above, "13" stages so that this counting tube system will, at this time instant, be at counting stage "7" as it has at first counted "13" pulses, and started again from "0" to count another "7" pulses for a total of "20" pulses. Counting tube system 3 receives as shown a number of pulses corresponding to the product of a factor which was registered in counting tube system 1 and another factor which was determined by counting tube system 2. Since in this example $2 \times 10 = 20$ pulses, these factors were "2" for the value registered in the control storage system 1 and "10" from multiple signal control unit 2.

If the digit value zero is entered on the keyboard 4 it is clear that no pulses need to be entered into the counter 3. In this case the flip flop 11 does not receive a pulse on line $11^1$. The flip flop 18 is switched by a pulse produced by the closing of contact $9^0$ on depression of the key $6^0$, instead of by a pulse from the output lead 14 of counter 5.

It is evident that if both factors are adjusted to other numbers a number of pulses will enter the counting tube 3 which equals the product of such new factors. As on the other hand the counting tube system 3 may be arranged to count in any desired scale, in this case to a capacity of "13," the resulting product will be divided by the capacity of this counting tube system 3 and will hold at the end of this process the remainder and deliver a number of pulses in output lead 21 corresponding to the respective digit values of the quotient.

These pulses are deliverd from the output lead 21 through diode 29 to the input lead "30" of flip flop 30 switching it over from its initial state to the opposite state. Amplifier 31 is thereby made operative under control of lead $30^3$. The first pulse applied to flip flop 30 by entering lead $30^1$ is that occuring at the end of the transfer of the value from counter 3 to counter 1. The pulses on lead $30^1$ are also supplied to the input lead $31^1$ of controlled amplifier 31. All the following pulses i.e. all the pulses produced on lead 21 by the pulses from the signal generator 13 after the first pulse can pass through amplifier 31 as said first pulse makes amplifier 31 operative by the switching over of flip flop 30.

These pulses are to indicate within the different denominations of the computation the respective digit value of the quotient formed by the number of pulses divided by the capacity of the counting tube system 3, in this case divided by "13."

The distribution into the different denominations of an output storage, formed by the counting tubes 32, 33 and 34, each wtih "10" stages takes place under the control of stepwisely operated distributor arm 35 making successive contact connections to contacts 36, 37 and 38 as a result of successive actuations of magnet coil 39 which forms a part of this electromechanical stepping switch having the said distributor arm 35. The magnet 39 is in a circuit from plus pole 10 through contact or switch $9^{12}$ to ground, and switch $9^{12}$ is closed at each depression of the key $6^2$. Similar contacts $9^{11}$ and $9^{13-19}$ are provided for the keys $6^1$ and $6^{3-9}$ and are connected in parallel with the contact $9^{12}$ Only the contact $9^{12}$ is shown in FIG. 2 for the sake of clarity. At each depressing of a key the switching or distributor arm 35 of the distributor is moved first into the contact position 36 and at the depression of the second key into switch position 37 and at the third key depression into the switch position 38. As shown in FIG. 2, the switch arm 35 initially rests on an unconnected contact 36a. A circuit is completed from the output lead 31² of the controlled amplifier 31 through distributor arm 35 at first to contact 36 and further to counting tube system 32 which has ten stages. The number of pulses delivered from counting tube system 3 through lead 21, in this case "1," will therefore be transferred at first into the first counting tube system 32 representing the first denomination of the resulting quotient.

After the result of the first computing process has been stored in the counting tube system 32, i.e.

$$\frac{2 \times 10}{13}$$

the second digit "4" of the dividend "2483" will be entered into the counting tube system 5 by depressing the key 6⁴ of the keys 6⁰⁻⁹. This second digit is counted into the counting tube system 3 in the manner described above, so that an addition of the remainder "7" from the preceding computation to the second digit "4" takes place in this counting tube system 3 thereby processing the second digit value of the dividend. If the result of this addition is greater than the counting capacity of the counting tube system 3, in this case "13," then an output pulse is delivered to lead 21, which will be stored in counting tube system 32 and represents the final result of this part of the computing process. The circuit for the magnet 39 is completed at substantially the same time as the flip flop 11 is switched over to allow transfer of the entered value from the counter 5 to the counter 3. Due to the inductance of the magnet winding the switch arm 35 does not leave the contact on which it is resting until after the value has been transferred to the counter 3. The switch over transfers to the next contact before the pulse train is entered into the counter 3 under control of the unit 2. There now stands in counting tube system 32 the value "1" being the first denomination of the quotient and in counting tube system 3 the new starting value "11." This starting value "11" now stored in counting tube system 3 is formed from the remainder "7" of the preceding computation and the new keyed-in digit value "4" and will be counted into counting tube system 1 as a complementary value to "13" in the way already described. Now, amplifier 24 will be made operative and the pulses from pulse generator 13 fed to counting tube system 2. The counting tube system 2 is repeatedly counted through and the counting tube system 1 counts during this process the output pulses at output lead 25 of the counting system 2. The control of amplifier 24 is effected in the way already described, so that the computing process "11"×"10" is then also effected, i.e. in counting tube system 1 are entered "11" output pulses from output lead 25, until a pulse is delivered through output lead 27 of counting tube system 1, preventing further pulse deliveries as described above. These "11"×"10"="110" pulses enter counting tube system 3 at the same time and count this system step by step and repeatedly beginning from "0."

During this operation of counting tube system 3, output pulses are delivered at output lead 21, which are fed to counting tube system 33 through arm 35 of the stepping switch which has now moved to contact 37 under the control of magnet coil 39 actuated by the depression of the key 6⁴ in the manner described above. The pulses register the result of the division of "110" by "13" in counter 33.

After this process is terminated, the key 6⁸ of keys 6⁰⁻⁹ corresponding to the third digit value, in this case "8," will be depressed and the counting tube system 5 will be set to the digit value "2," which is the complement to "10" of the digit value "8." The counting tube system 5 will then be counted through by pulses from pulse generator 13 until it reaches the "0" stage of the counting tube. "8" pulses are thereby delivered into counting tube system 3. These "8" pulses are also added to the remainder "6" which was left registered in counting tube system 3 as a remainder of the computation "110" divided by "13."

As the result of this addition "6"+"8" is "14," which is higher than "13," a positive pulse is delivered at output lead 21 which is fed through distributor arm 35 and contact 37 to the counting tube system 33, and the counting tube system 3 is then at counting stage "1" as a final result of the second part of the computing process. Even though the magnet 39 has been connected in circuit by the depression of the key 6⁸, the arm 35 will not yet have moved from the contacts 37 to which it was moved by the previous energization of the magnet. There then stands therefore in counting tube system 32 the value "1," and in counting tube system 33 the value "9" being the first and second denominations of the quotient, and in counting tube system 3 there stands the value "1" as a new starting value. After the complementary value to "13" of the new starting value "1" stored in counting tube system 3 has been transferred to counting tube system 1, i.e. by a transfer of 12 pulses, the above described process is repeated, i.e. pulses are continuously fed to tube system 2, whereas the output pulses at output lead 25 operate counting tube system 1 until a pulse at output lead 27 switches the flip flop 22 and interrupts the supply of pulses.

As counting tube system 1 is set to the complementary value of "1" to "13," i.e. to the digit value "12," after one pulse at output lead 25 has been delivered to the system 1, a pulse is also delivered at output lead 27, i.e. only ten pulses are fed to counting tube system 2. These ten pulses are also fed to counting tube system 3 which is then set to the digit value "10" and during this process no output has arisen at output lead 21. Therefore counting tube system 34, which is connected to output lead 21 through the distributor arm 35 which has then moved to contact 38, registers "0."

The last digit value, namely "3" of number "2483" is then keyed-in and three pulses are delivered into counting tube system 3. These three pulses advance the counting tube system 3 further from stage 10 to stage 13, i.e. to the zero position, so that a pulse is delivered to output lead 21, which is fed through distributor arm 35 and contact 38 to the counting tube system 34. The result of the division "2483" by "13" is then stored in the counting tube system 32, 33 and 34 denominationwise, as the final result of the third part of the computation process. There then stands in the counting tube systems 32, 33 and 34, the values "1," "9" and "1" respectively being the full resulting quotient 191, and in the counting tube system 3 there is a remainder "0." This reminder "0" may be used as a check symbol for the number "2483,"' on the base of prime number "13."

The above described example, namely "2483" divided by "13" follows closely the usual arithmetical process:

```
13)2483(191
   13
   ‾‾
   118
   117
   ‾‾‾
     13
     13
     ‾‾
     ..
``` but with a denomination-wise obtaining of the quotient as the dividend is put in denomination-wise. That is to say, with a pre-selected divisor represented by the capacity of the counting tube system 3, as each denomination of the dividend is put in, the corresponding denomination of the quotient is calculated. For other divisors, suitable adjustment of the counting tube system 3 is made, for example as described below.

The remainder indicated by counting tube system 3, in this case "0," may be directly transferred into one special printing stage for such non-decimal values to be used as a one-digit symbol. This counting tube system 3 could also consist of a plurality of such counters, as described later, so that the remainder may be indicated for instance in the decimal scale in more than one denomination. Also the remainder may be transferred similarly to the storing of the quotients into output storage tubes corresponding to the tubes 32—34 and from there to the corresponding positions of a printer.

If the capacity of the counting tube system 3 is adjustable, also division by any other number within the counting capacity of counting tube system 3 may be effected. At the same time also the counting capacity of the counting tube system 1 will be adjusted to the counting capacity of counting tube system 3, in order to allow a transfer of the complementary value corresponding to the respective counting capacity of counting tube system 3. The arrangement described above is designed to deal with the keyed input of a four digit decimal value which produces a 3 digit quotient. Thus, if the value 28 is to be entered, it is keyed in as 0028, so that the distributing switch 35, 36 etc., enters the quotient into the correct ones of the tubes 32, 33 and 34. The energization of the magnet 39 caused by the input of the fourth digit of a group moves the arm 35 from the contact 38 back to the contact 36a.

If on the other hand the counting capacity of the counting tube system 2 is made adjustable, it is possible to multiply each keyed-in digit value by any selected multiplier within the range of counting tube system 2. In order to store the result of such a multiplication, counting tube system 3 is arranged to have a plurality of counters (described below) and adjusted to "10" stages. The results of the partial multiplications are then delivered to the different input leads of counting tube system 3. If for instance the multiplication "17"×"25" is to be effected, the result of the first partial multiplication beginning at the lowest denomination is "5"×"17"=85. These 85 pulses are introduced into the input lead of the at least significant counting tube system 3 which system must now be considered as including three dekatron tubes arranged in a manner similar to the two tubes shown in FIG. 5b and adjusted to "10" stages. Also a distributor will be included switching from tube to tube controlled correspondingly to distributor 35—38. The result of the second partial multiplication, namely "2"×"17"="34" pulses which are delivered to the input lead of the next higher counting tube which is now at stage "8," the lowest tube being at stage "5" and this gives an eventual count of "425." The capacity of the counting system 3 will be determined by the highest product expected.

In the case described the distributor ram will move from the lowest to the highest counting tube. When multiplication begins from the highest denomination, the distributor will operate in the reverse direction. A print of the result can be obtained if the result is transferred from counting system 3 to the storage tubes 32—34, or such tubes could replace the system 3 if a carry-out arrangement from tube to tube in the series 32—34 is provided, and they could then be used as well for the computation as from the control of the print.

Instead of using a complementary counting, computing in an additive way, counting back to zero may be adopted with the counters controlled to perform direct subtraction. The print is effected in the following way. Motor 40 switched in by control switch $40^2$ drives shaft 41. $40^1$ and through friction clutch 40a drives the shaft 41. On shaft 41 are the type wheels 42, 43, 44 and 45 having ten type faces on each of the wheels 42, 43 and 44 and 13 type faces on the wheel 45.

On shaft 41 is furthermore the extension arm 46 lying against the armature 47 and forming together with said armature, actuated under control of start magnet 48, a one-rotation clutch' On the depression of key 49 of keyboard 4 switch $49^1$ is closed forming a circuit from plus pole 50 through start magnet 48 and capacitor 51 to ground at 52. Resistor $51^1$ is a discharge resistor for capacitor 51. The closing of switch $49^1$ momentarily energizes the magnet 48 and operates armature 47 releasing shaft 41 for one rotation before the extension arm 46 is again blocked by armature 47. On shaft 41 is furthermore the pulse generator arm 53 making successive contact connections from minus pole 55 through arm 53 to the pulse generator contacts $54^1$–$54^{13}$ and $54^{14}$. The position of the contacts $54^{1-10}$ corresponds to the relative positions of the type faces of the type wheels 42, 43 and 44 and the contacts $54^{11-13}$ correspond to the three extra type faces on the wheel 45.

The depressing of key 49 of keyboard 4 effects the closing of switch $49^1$ as described above, and in consequene produces one rotation of the contact arm 53 of the impulse generator mounted on shaft 41. When the shaft rotates once, this wiping arm 53 wipes over the contacts $54^{1-13}$ thereby connecting the minus pole 55 through wiping arm 53 to the different contacts $54^{1-13}$ successively, thereby delivering negative pulses through diodes $56^{1-3}$ to the input leads of counting tube systems 32, 33, 34, thereby advancing them further step by step. Each of the counting tube systems 32, 33, 34 has a connection from the zero stage to the leads $57^{1-3}$ connected to the printing devices 42 to 44.

The printing devices are described in more detail with reference to FIG. 3 and they each comprise a discharge arrangement under the control of pulses delivered when the discharge reaches the zero stage and igniting the respective discharge element to effect a print at the respective rotation of the type wheels as described later. Similarly to the process described, the printing of the check symbol denomination is effected by printing device 45 operated under control of counting tube system 3. The count takes place similarly as described above with reference to the diode connections from impulse generator contacts $54^{1-13}$ through diodes $56^{1-3}$ to output storages 32, 33, 34. For the last denomination the respective lead goes from the pulse generator contacts $54^{1-13}$ through diode 58 to the input lead $3^1$ of the counting tube system 3. On depression of key 49, switch $49^2$ is shifted, and there is therefore a connection from output lead 21 through diode 29, the shifted switch $49^2$ to the last denomination printing stage 45. As soon as a pulse is delivered through output lead 21 in the manner described when the zero stage of this counting arrangement 3 is reached, this pulse effects the print of the digit value within the last denomination with one of the thirteen possible characters with the means described in more detail with reference to FIG. 3.

The re-setting of the counting tube systems 32, 33, 34 and 3 after the actuation of the print is effected by the passing of wiping arm 53 over contact $54^{14}$, delivering a pulse through capacitor 59 and diode 60 through lead 21 to the zero stage of counting tube system 3, and through capacitor 59, lead 61 and diodes $62^{1-3}$ to the zero stages of the counting tube systems 32, 33 and 34. The print of the quotient as well as of the remainder is thereby achieved, and it is evident that such prints may be done with any sort of printers and that also the remainder could be indicated by two printing stages instead of one printing stage for the print of a one-denomination check symbol.

Figure 3:
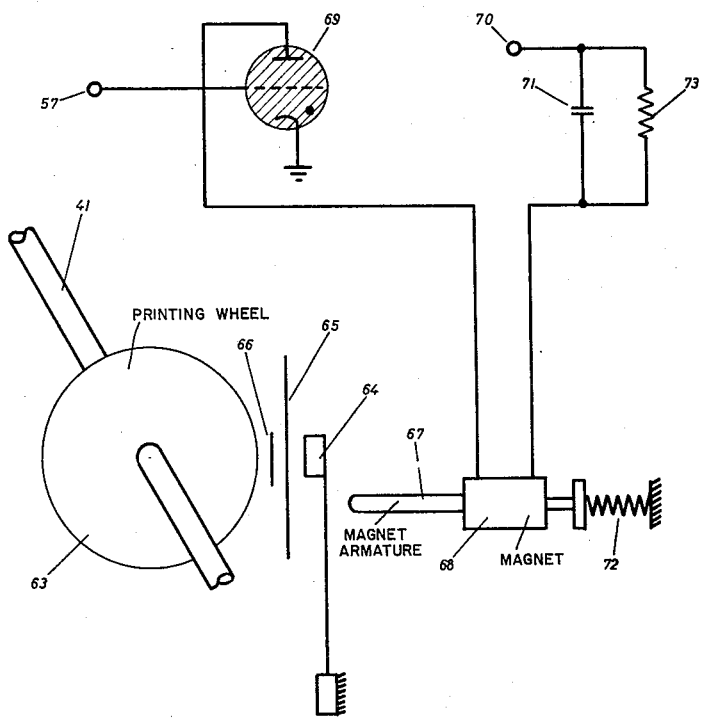
FIG. 3 is a schematic block diagram of the control circuits associated with a single type wheel.

FIG. 3 shows one of the printing devices 42, 43, 44 and 45 in more detail. Each of these devices includes printing wheel 63, mounted on shaft 41. Against this printing wheel 63, which is provided on its circumference with the type faces which are to be printed, the printing hammer 64 will press the material 65 on to which the print is to be made, as well as the ink ribbon 66. This is effected by the armature 67 of magnet 68. The energization of magnet 68 is effected by a positive pulse entering through lead 57 and igniting the gas discharge tube 69. A circuit is thereby closed from pulse pole 70 through capacitor 71, magnet coil 68 and gas discharge tube 69 to ground. The magnet 68 is energized by this current so that armature 67 is pulled against the tension of spring 72, so that the printing hammer 64 is moved against the material on which print has to be effected, and the type then in printing position on type wheel 63 will be printed.

The moving of the printing hammer 64 takes place only during a very short time instant under control of armature 67, as when capacitor 71 ceases to draw an appreciable charging current the current through gas discharge tube 69 is determined by resistor 73. The value of this resistance is such that the current flowing through it is insufficient to hold the gas discharge tube 69 ignited, so that after the charging of capacitor 71 the gas discharge tube 69 is automatically extinguished. The resistor 73 then discharges capacitor 71 and thereby allows a new pulse entering through lead 57 to effect a new ignition of gas discharge tube 69.

As shown in more detail below, the input for a computation, and also the result of the computation, may be printed, in the first case as the input means is operated (e.g. each depression of a key or each operation of an input switch) by a denomination-wise operative printer and in the case of a result, since such result is obtained denomination-wise, the result may be printed denomination-wise, that is again, following the operation of each input key or input switch.

Figure 4A:
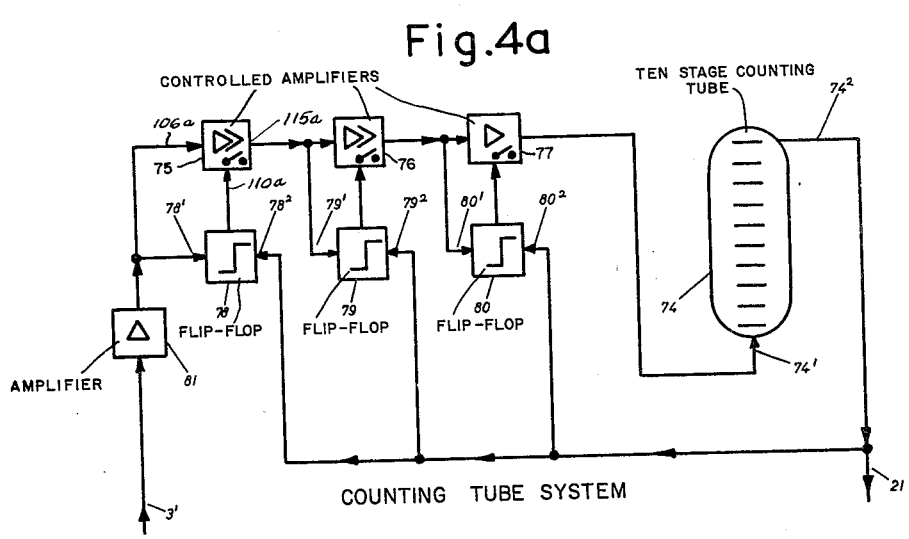
FIGS. 4a and 4b are block diagrams of two forms of counter for counting in the scale of 13.
Figure 4B:
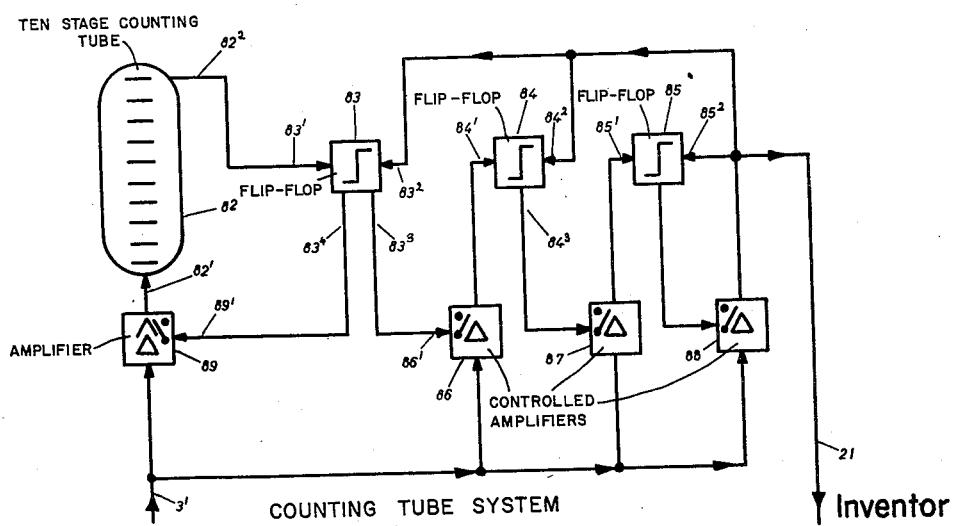

FIGS. 4a and 4b show in proper diagram form two suitable arrangements for the counting tube systems 1 and 3 of FIG. 2 with a counting capacity of 13 pulses. FIG. 4a includes the ten-stage counting tube 74, as well as the three controlled amplifiers 75, 76 and 77. These amplifiers are controlled respectively by the flip flops 78, 79 and 80, arranged on the input side of the ten-stage tube 74. Furthermore, this counting tube system includes the non-controllable one stage amplifier 81. The effect of amplifier 81 is the following. Negative pulses enter through input lead $3^1$, which is the input lead of counting tube system 3 in FIG. 2, into the amplifier 81. These pulses are inverted in their polarity. The first pulse entering lead $3^1$ will be fed through lead $78^1$ to the flip flop 78 and switches this flip flop into the other stable state, so that the amplifier 75 is made operative. The second pulse at lead $3^1$ thereby is fed to the flip flop 79 by entry lead $79^1$ through amplifier 81 and the amplifier 75. This flip flop 79 switches therefore into its other stable state and makes the amplifier 76 operative, so that the third pulse coming through amplifier 81 and through the amplifiers 75 and 76 is fed to flip flop 80 through the input lead $80^1$. The amplifier 77 will thereby be made operative.

The then following pulses entering through lead $3^1$ are passed to the ten-stage counting tube system 74 through the amplifiers 81, 75, 76 and 77 and through input lead $74^1$. This counting tube system will be counted through, beginning from the zero position, until a positive pulse is delivered at output lead $74^2$. As the counting tube 74 has ten stages, this output pulse in output lead $74^2$ is delivered after a total of 13 input pulses at input lead $3^1$. The pulse delivered at lead $74^2$ is fed to the leads $78^2$, $79^2$ and $80^2$ of the flip flops 78, 79 and 80 and switches these therefore back into their initial states, so that the amplifiers 75, 76 and 77 are then made inoperative again. Simultaneously, the pulse is fed to the output lead 21 and may therefore be used for the switching functions described above with reference to FIG. 2.

FIG. 4b shows an alternative arrangement in which the amplifiers and the flip flops are switched in a circuit on the output side of the ten-stage counting tube. The counting tube system shown in FIG. 4b includes the counting tube 82, with ten stages, the flip flops 83, 84 and 85 as well as the controlled amplifiers 86, 87 and 88. Furthermore, it shows the two-stage amplifier 89. The effect is the following. The negative pulses entering through input lead $3^1$ are amplified through the normally operative amplifier 89 and are delivered to the input lead $82^1$ of the ten-stage counting tube 82. After ten pulses have been entered into counting tube 82, a positive pulse is produced in output lead $82^2$. This pulse enters the flip flop 83 at lead $83^1$ and switches it into its other stable state. The amplifier 89 will thereby be made inoperative by a common connection over leads $83^4$ and $89^1$ and amplifier 86 will be made operative by a connection over leads $83^3$ and $86^1$. The eleventh pulse entering at lead $3^1$ is then delivered through amplifier 86 to input lead $84^1$ of flip flop 84.

This flip flop 84 will be switched into its opposite stable state and thereby makes amplifier 87 operative. The twelfth pulse entering through lead $3^1$ is transferred through the amplifier 86 to input lead $84^1$ of flip flop 84, but it has no effect on this flip flop. Simultaneously this pulse is delivered through amplifier 87 to the input lead $85^1$ of flip flop 85. The flip flop 85 will be switched into its opposite stable state and will therefore make amplifier 88 operative. The following thirteenth pulse is fed through amplifier 88, to the input leads $83^2$, $84^2$ and $85^2$ of the flip flops 83, 84 and 85. These flip flops are thereby switched into their initial stable state and the amplifiers 86, 87 and 88 are made inoperative, whereas amplifier 89 will be made operative. Simultaneously this thirteenth pulse passes through amplifier 88 to the output lead 21, and may therefore be used for further control functions. The fourteenth pulse entering through lead $3^1$ enters the ten-stage counting tube 82 through amplifier 89, so that the process above described repeats.

Figure 5A:
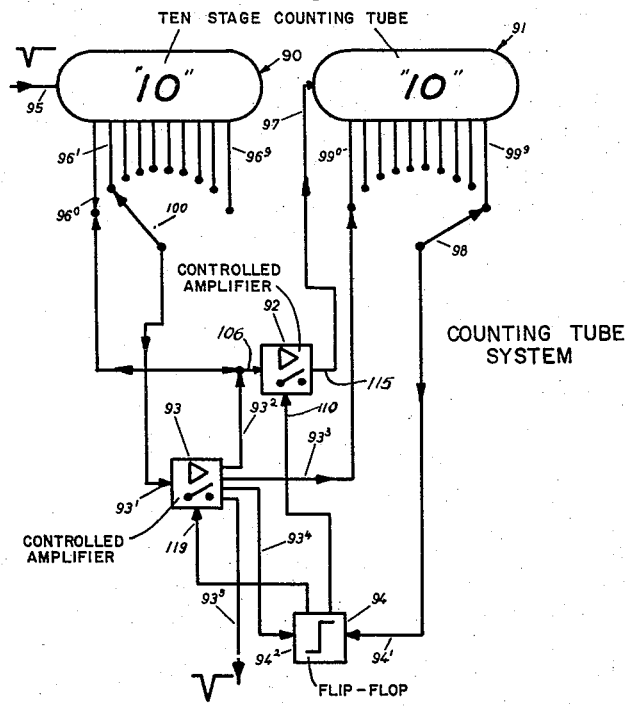
FIGS. 5a, 5b and 5c show in block form three different arrangements of the counter with provision for adjusting the counting capacity.

FIG. 5a shows a counting tube system having an adjustable counting capacity. This counting tube system includes the two ten-stage counting tubes 90 and 91 as well as the two controlled amplifiers 92 and 93 and flip flop 94. The operation of this counting tube system is as following. Initally, amplifier 92 is held operative by flip flop 94, while amplifier 93 is inoperative. The pulses entering at input lead 95 advance the ten-stage counting tube 90 step by step. After ten pulses a positive output pulse is produced in output lead $96^0$, which is fed through amplifier 92 to the input lead 97 of the ten-stage counting tube 91. This pulse advances the counting tube 91 by one stage. After the counting tube 90 has been counted through so often that the discharge in the counting tube 91 has reached the stage to which switching arm 98 has been set, then a positive pulse is delivered through the corresponding lead $99^{0-9}$, through the switching arm 98, to the input lead $94^1$ of flip flop 94. The flip flop 94 will thereby be switched over into its opposite stable state. The amplifier 92 will thereby be made inoperative and amplifier 93 will be made operative. If then, counting tube system 90 will be counted on by the pulses entering at input lead 95 up to that stage to which the switching arm 100 has been set, then the output pulse delivered to the corresponding output lead $96^{0-9}$ enters the amplifier 93 through switching arm 100 and input lead $93^1$.

After the pulse has been amplified in amplifier 93 it is delivered as a negative pulse through output lead $93^2$ to the output lead $96^0$ of the counting tube system 90 and thereby switches said counting tube system back to the "0" stage. Simultaneously a negative pulse enters counting tube 91 through lead $93^3$ and lead $99^0$, whereby this counting tube is also switched back to the zero position. A positive pulse enters flip flop 94 through output lead $93^4$ of amplifier 93 and input lead $94^2$, whereby this flip flop is switched back into its initial stable state. The amplifier 93 will thereby be made inoperative and the amplifier 92 will be made operative again. A negative pulse is delivered through output lead $93^5$, which may be used for the control of further switching functions.

In the example shown, the counting tube system is adjusted to a counting capacity of 91 pulses, i.e. 91 pulses have to enter the counting tube system at input lead 95 before an output pulse is delivered through output lead $93^5$.

By these 91 pulses the counting tube 90 is cycled nine times and output lead $96^0$ receives nine output pulses, which advance the counting tube 91 by nine stages. The ninth of these pulses switches the glow discharge within counting tube 91 to output lead $99^9$, whereby a positive output pulse is delivered through this lead. This pulse enters flip flop 94 through switching arm 98 and effects the switching over process in the flip flops and amplifiers as above described. The then following ninety-first pulse at input lead 95 switches counting tube 90 from counting stage position "0" to the counting stage position "1" and the output pulse thereby delivered to output lead $96^1$ enters the amplifier 93 through switching arm 100, whereby the said switching functions described above may be actuated and the counting tube system will be prepared for the beginning of a new counting cycle.

The switching arms 98 and 100 may comprise electronically-controlled switching circuits. For example counting tubes set to particular stages, one of which tubes represents switching arm 100, and the other of which represents the switching arm 98, may select respectively any desired output lead $96^{1-9}$ for the units and any desired output lead $99^{1-9}$ for the tens. For instance the output leads $96^1$ and $99^9$ would be selected for a counting capacity of 91 pulses. This adjustment may be effected by delivering pulses to said controlling counting tubes so that the counting capacity of the tubes 90 and 91 may be varied merely by the delivery of a selected number of pulses to each controlling tube for units, tens and so on, or by feeding a pulse to a selected counting electrode of a controlling counting tube. This is described in more detail below with reference to FIG. 12.

Figure 5B:
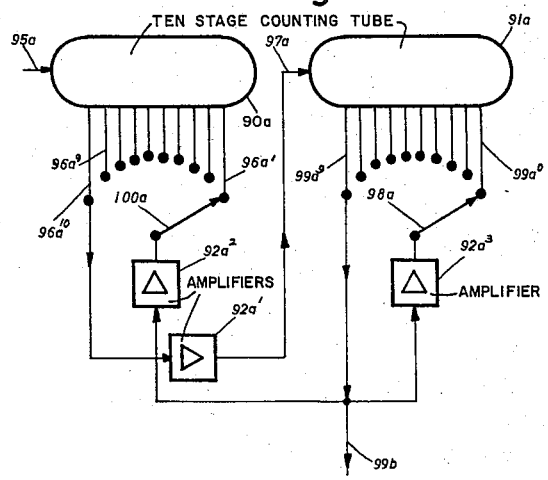

FIGURE 5b shows a variation of the counting tube system shown in FIGURE 5a having variable counting capacity. The counting tube system which is shown in FIG. 5b includes two counting tubes 99a and 91a corresponding to the counting tubes 90 and 91 shown in FIG. 5a. Counting tube 90a is used for determining the units and counting tube 91a is used for determining the tens. The operation of the counting tube system is as follows: Negative pulses are introduced through input lead 95a to the counting tube 90a which advance the glow discharge along the counting cathodes step by step. After the glow discharge has reached that cathode which is connected with the output lead $96a^{10}$, a positive pulse is fed through this lead, and through amplifier $92a^1$ and through the input lead 97a to the counting tube 91a. Comparably, each such pulse advances the glow discharge within counting tube 91a from one counting cathode to the next counting cathode. After the glow discharge within this counting tube 91a has reached the counting cathode which is connected with the output lead $99^9$, a positive pulse is delivered through output lead 99b, which may be used for further control purposes.

This pulse is delivered simultaneously through the two amplifiers $92a^2$ and $92a^3$ and switching arms 100a and 98a, which may be selectively connected with one of the output leads $96a^{1-10}$ and $99a^{0-9}$. Positive pulses received by amplifiers $92a^2$ and $92a^3$ are delivered as negative pulses to output lead $96a^1$ and $99a^0$ and thus to the respective cathodes of the counting tubes 90a and 91a. By these negative pulses the glow discharge which is between the anode and one of the counting cathodes of the counting tubes 90a and 91a will be advanced to that cathode which is connected to the output lead and which has been made effective by the position of the two switching arms 98a and 100a.

The output lead position is thereby determined for the counting process, determining the pulses which are delivered through input lead 95a to the counting tube 90a and advance this tube, in the shown position of switching arms 98a and 100a connected to the cathode with output lead $96a^2$ to a cathode of the output lead $96a^1$ and from there to the cathode of the output lead $96a^{10}$.

After these two pulses a positive pulse is delivered through output lead $96a^{10}$, which is conducted through amplifier $92a^1$ and through input lead 97a and a negative pulse is fed to the counting tube 91a. The counting tube will thereby be advanced from the cathode corresponding to output lead $99a^1$ to the cathode of output lead $99a^0$. After 10 more pulses, which enter counting tube 90a through input lead 95a, a second output pulse is delivered through output lead $96a^{10}$, which advances the glow discharge within the counting tube 91a from the cathode 99a co-ordinated to the output lead $99a^0$ to the counting cathode co-ordinated to the output lead $99a^9$. The mentioned positive output pulse is thereby delivered and effects through the amplifiers $92a^2$ and $92a^3$ an adjustment of the two counting tubes 90a and 91a again, so that the described process repeats. The index numbers of the output leads $96a^{1-10}$ and $99a^{0-9}$ are representative of the digit values, which are determined by respective adjustment of the switching arms 98a and 100a, and thereby determine the counting capacity of this counting tube system.

Figure 5C:
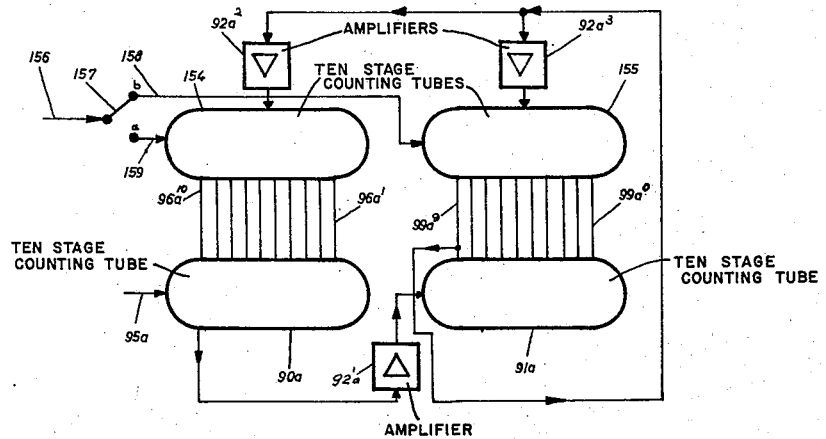

FIGURE 5c shows a variation of the counting tube system of FIGURE 5b. In the embodiment of FIGURE 5c the switching arms 98a and 100a are replaced by the two counting tubes 155 and 154 in order to allow an electronic adjustment of the counting capacity of these tubes. The counting process itself is effective in the manner described above with reference to FIGURE 5b.

The positive pulses delivered through the output leads $99a^0$ are now fed through the amplifiers $92a^2$ and $92a^3$ to the two counting tubes 154 and 155 which are thereby advanced according to the process described below with reference to FIGURE 12.

The adjustment of the counting tubes 154 and 155 to a determined digit value is effective in such a way, that from input lead 156 negative pulses are delivered to switch 157 to switching position a or b, and are thus fed to input lead 159 or 158. The counting tubes 154 and 155 are advanced by these negative pulses by so many stages as corresponds to the value of the counting capacity which is to be set.

The effect of these counting tubes 154 and 155, used as selective switches, is such that the glow discharge between the anode and one of the cathodes of the respective counting tubes is always between only one single cathode and the anode. The selecting of the respective cathode may be effected by switching the glow discharge by a respective number of pulses into the counting tube to the input lead 158 or 159. Also a direct switching of the discharge to a selected cathode may be used. The negative pulses, which are conducted through the two amplifiers $92a^2$ and $92a^3$ to the two counting tubes 154 and 155, are delivered to the anode of the respective counting tubes, and the potential at the cathode carrying the glow discharge follows the potential alteration at the anode. A transfer of the negative pulse delivered to the anode to one determined and preselected cathode thereby takes place and from this cathode this pulse is delivered through the respective one of the leads $96a^{1-10}$ and $99^{0-9}$ to the two counting tubes 90a and 91a and the counting takes place according to the process described above with reference to FIGURE 5b.

Figure 6:
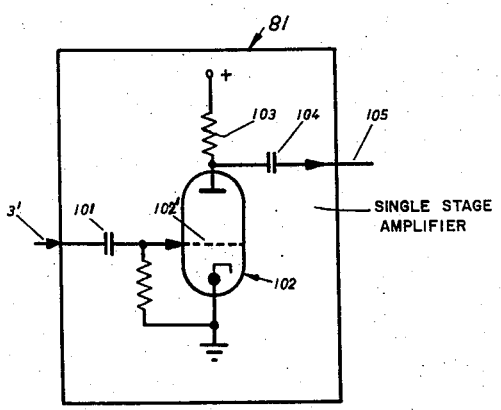
FIG. 6 is a circuit diagram of a single stage amplifier.

FIGURE 6 shows the single stage amplifier 81 of FIG. 4a in more detail. In this amplifier negative pulses enter from input lead $3^1$ through capacitor 101 to the grid $102^1$ of triode 102. These negative pulses generate positive pulses across the anode resistor 103, which are transferred through capacitor 104 to the output lead 105.

Figure 7:
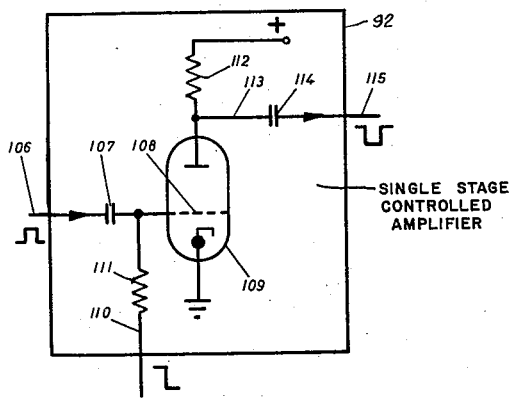
FIG. 7 is a circuit diagram of a single stage controlled amplifier.

FIG. 7 shows the single-stage controllable amplifier 92 which is similar to the amplifiers 77, 92a and 93. In this amplifier positive pulses enter through input lead 106 and through capacitor 107 to the grid 108 of the triode 109. This grid is more or less negatively biassed by the control lead 110 through grid resistor 111 from a flip flop (not shown in FIG. 7). If the negative bias is much greater than the amplitude of the positive pulses delivered through input lead 106, these pulses cannot raise the grid above cut-off, so that no current flow will be produced through anode resistor 112. If on the other hand the negative bias at control lead 110 is less negative the positive pulses entering through lead 106 cause current flow through the anode resistor 112, which produce negative pulses at lead 113. These pulses are delivered through capacitor 114 to the output lead 115.

The circuit of the amplifiers 86, 87 and 88 is identical with that of the amplifier 92, but the potential of the line 110 is either below cut-off or at approximately ground potential since these amplifiers receive negative pulse inputs.

Figure 8:
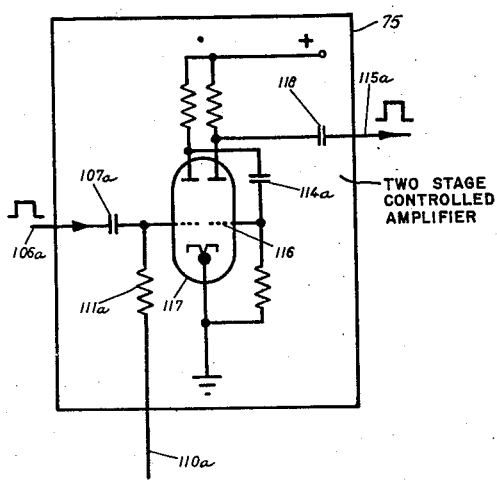
FIG. 8 is a circuit diagram of a two-stage controlled amplifier.

FIG. 8 shows the controllable two-stage amplifier 75 which is similar to amplifier 76. This amplifier differs from the single-stage amplifier shown in FIG. 7 only by the fact that the negative pulses passing through capacitor 114a are not directly delivered to the output lead 115a but are transferred to the right hand grid 116 of the double triode 117. These pulses are thereby amplified a second time in the right hand system of the double triode 117 and are delivered as positive pulses through capacitor 118 to the output lead 115a.

Figure 9:
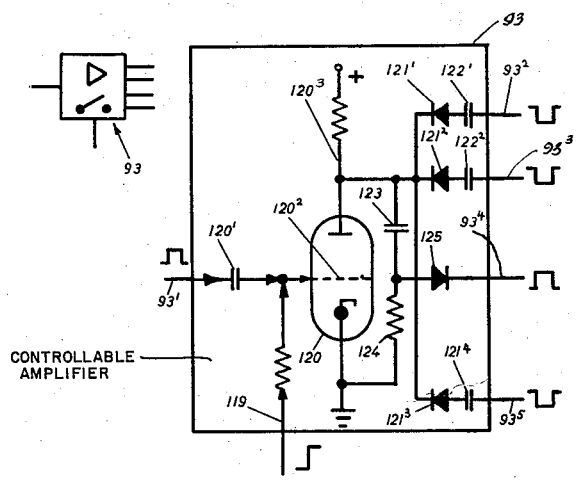
FIG. 9 is a circuit diagram of a controlled amplifier with multiple outputs.

FIG. 9 shows the controllable amplifier 93 in more detail. In this amplifier positive pulses enter from input lead $93^1$ through capacitor $120^1$ to the grid $120^2$ of triode 120. The grid of this triode is pre-biassed more or less negatively at the input lead by a flip flop (not shown in FIG. 9). Consequently no pulses or negative pulses are delivered to the anode lead $120^3$, in dependence on what negative bias was effective at the control lead 119. These negative pulses are transferred to two of the four output leads $93^2$ and $93^3$ through the diodes $121^1$ and $121^2$ and the capacitors $122^1$ and $122^2$. The diodes are used for preventing interaction between these output leads. The negative pulses generated at anode lead $120^3$ produce positive pulses in output lead $93^4$, as a differentiation of the negative pulse takes place by capacitor 123 and resistor 124. Of both positive and negative pulses generated by the differentiation, the negative pulse is blocked by diode 125, so that only a positive pulse is delivered to output lead $93^4$. A negative pulse is delivered to output lead $93^5$ through the diode $121^3$ and capacitor $121^4$.

Figure 10:
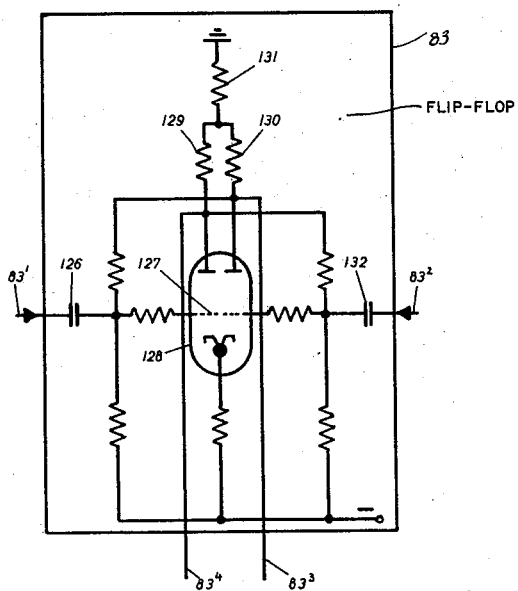
FIG. 10 is a circuit diagram of a flip flop stage.

FIG. 10 shows the flip flop 83 of FIG. 4b in more detail. The switching circuits and the effect of flip flops are well known. The control of the flip flop and thereby of amplifiers 89 and 86 through the two control leads $83^3$ and $83^4$ is effected in such a way, that positive pulses are delivered through control lead $83^1$ and capacitor 126 to the left hand grid 127 of the double triode 128. The left hand system of the double triode 128 thereby becomes conductive, so that a large voltage drop is generated across anode resistor 129. This voltage drop reduces the potential of control lead $83^4$ relatively to ground. Simultaneously the right hand system of the double triode 128 becomes non-conductive, so that negligible voltage drop is generated across anode resistor 130 and the voltage of control lead $83^3$ thereby becomes less negative relatively to ground, i.e. it is then only biased effectively by the voltage drop across the common anode resistor 131. If a positive pulse is delivered through input lead $83^2$ and capacitor 132 to the right hand system of the double triode 128, then this system becomes conductive, whereas the left hand system becomes non-conductive. The relationships of the voltages are thereby reversed at both control leads $83^4$ and $83^3$.

The flip flops 84, 85 and so on differ from flip flop 83 shown above only by the lack of a control lead corresponding to control lead $83^4$.

FIG. 11 shows the ten-stage counting tube 90 which is similar to the stage 91. Negative pulses input through entry lead 95, and are fed through capacitor 133 to the auxiliary electrode systems 134 and 134a. A glow discharge between anode 135 and one of the counting cathodes $136^{0-9}$ is thereby advanced further by one stage at each pulse in known manner. When the glow discharge arrives at one of the cathodes $136^{0-9}$ a current flows through the corresponding one of the resistors $137^{0-9}$, whereby a positive pulse is generated in the corresponding one of the leads $138^{0-9}$. This pulse is fed through the respective one of the capacitors $139^{0-9}$ to the output leads $96^{0-9}$.

The ten-stage counting tubes 74 and 82 differ from the counting tube shown in FIG. 11 only by the elimination of capacitors $139^{1-9}$ and the associated leads. An output pulse is delivered after each ten entering pulses of the lead corresponding to the lead $96^0$.

FIG. 12 shows an electronic switching device, which may be used instead of the switching arms 98 and 100 of FIG. 5a. Each switching device includes the ten-stage counting tube 140. The counting cathodes $141^{0-9}$ are connected through capacitors $143^{0-9}$ to the output leads $96^{0-9}$ of the ten-stage counting tube 90. Furthermore the cathodes $141^{0-9}$ are connected through the resistors $144^{0-9}$ to ground. The anode 145 of the glow discharge tube 140 is connected through anode resistor 146 with the plus pole 147. The control of the electronic switch is effected in such a manner that a negative pulse is conducted from minus pole 150 through the closed switch of switches $148^{0-9}$ and the respective capacitor $149^{0-9}$ to the corresponding one of the cathodes $141^{0-9}$ at the closing of one of the contacts $148^{0-9}$. If negative pulses enter the ten-stage counting tube 90 through input lead 95, this tube is counted through stage by stage. Positive output pulses are thereby generated at the output leads $96^{0-9}$.

The selection is effected by that one of the positive pulses at the output leads $96^{0-9}$ which is conducted through the respective one of the capacitors $143^{0-9}$ to the cathode $141^{0-9}$, at which there is a glow discharge between cathode and anode 145. By this positive pulse, which is conducted to the respective counting cathode, a positive pulse is generated across anode resistor 146 as the voltage at the cathode is increased by the pulse, whereas the arc voltage of the glow discharge remains constant. This positive pulse, which is generated across anode resistor 146, is conducted through capacitor 151 to the amplifier 152 and may be taken from output lead 153 for further control purposes.

Figure 13:
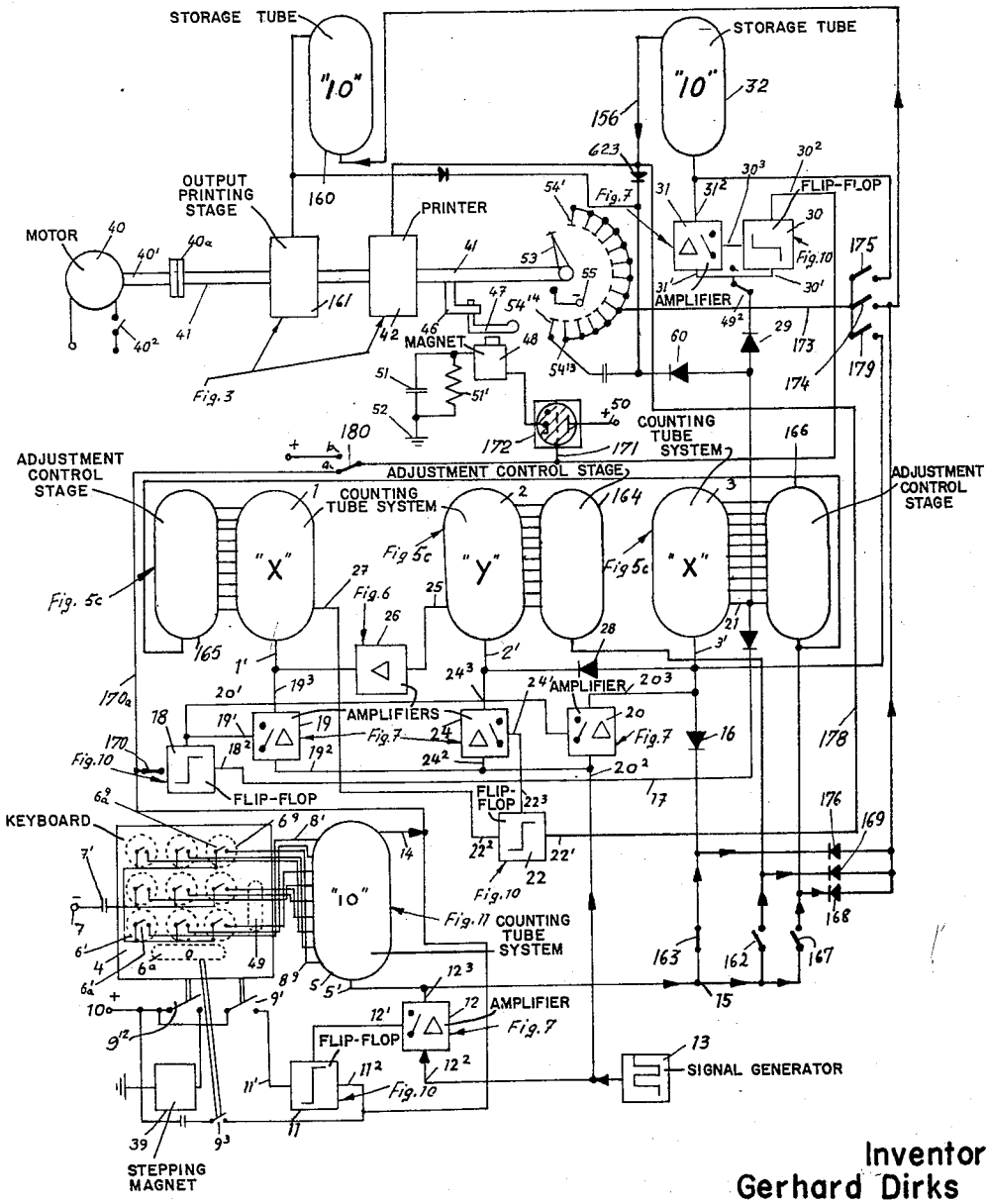
FIG. 13 is a diagram of a modification of the arrangement shown in FIG. 2.

FIGURE 13 shows a variation of the computing means described with reference to FIG. 2. The difference between the two computing means is that the multiplication and division described above with reference to FIG. 2, with the use of the prime number 13, may be effected within this arrangement with any number within the respective maximum counting capacity of the counting tube systems 1, 2 and 3, which are of an adjustable type in the embodiment of FIG. 13.

A further difference is that, instead of the three storage tubes 32, 33 and 34 and instead of the three output stages 42, 43 and 44 in FIG. 2, the arrangement shown in FIG. 13 has only one storage tube 32 and one output stage in the form of a printer 42 for printing the result of the computing process.

Furthermore, a storage tube 160 and an output stage 161 is provided for printing the numbers keyed in within the keyboard 4.

If now for instance, the computation $$\frac{a \, x \, y}{x}$$

is to be effected, the following pulses will become effective. At first contact 162 will be closed by the pressing down of one of the keys and contact 163 will be opened. It is thereby possible to adjust the counting tube system 2 to any selected counting capacity by depressing the key $6^{1-9}$ of keyboard 4 representing the multiplier y.

This may be effective in such a way, that by depression of the respective key of the keys 6¹⁻⁹ of the keyboard 4 in the manner described above with reference to FIG. 2, the counting tube system 5 will be adjusted successively to the digit values of the single digits of the multiplier, and through the then closed contact 162 the pulses delivered through amplifier 12, which advance the counting tube 5, are fed to the adjusting control stage 164 of counting stage 2. Pulses which are representative of single digits of the multiplier are entered by respective switching means, which are contained in this adjustment control stage 164 successively through the different stages of the control stage 164 (adjustment control stage). The adjustment control stage 164 corresponds together with counting tube system 2 essentially to the arrangement shown in FIG. 5c. The counting tube systems 1 and 3 with adjustment control stages 166 and 165 are of the same design. After the input to the multiplier had been made in the manner described above, contact 167 will be closed by depressing the respective key and simultaneously the key which had closed the contact 162 will be released. Contact 163 will also be opened by depressing of this key which closes the contact 167. The pulses delivered to amplifier 12 first by closing the contact 167 can now input the entry leads of the adjustment control stages 165 and 166.

By entering the divisor by the respective keys 6¹⁻⁹ of the keyboard 4, an adjustment of the counting tube systems 1–3 to the numerical value of the divisor is effected. The negative pulses entering through the contacts 162 and 167 are conducted through the diodes 169 and 168 to the counting tube system 160. Simultaneously with the closing of the contacts 162 and 167 by depression of the key as explained above contact 170 will be opened. Thus the positive pulse produced in the output lead 14 of counting tube system 5, which terminates delivery of signals through amplifier 12, starts the computing process in the manner described above with reference to FIG. 2 and is prevented from switching over the flip flop 18. This pulse will be delivered through lead 170a to the input lead 171 of the gas discharge stage 172. The gas discharge tube 172 will thereby be ignited and a circuit will be closed from plus pole 50 through gas discharge stage 172, magnet 48 and capacitor 51 to ground. Armature 47 will be actuated by excitation of the magnet coil 48 in the manner described above, and one rotation of shaft 41 will thereby be effected. By the rotation of shaft 41, switching arm 53 will be moved over the contacts 54¹⁻¹⁴ so that negative pulses will be delivered to lead 173. These negative pulses are conducted to the input lead of counting tube system 160 through contact 174, which has been closed likewise by the two keys which have closed the contacts 162 and 167. The output process and resetting of the tube 160 will thereby be effected in the same way as described above with reference to FIG. 2, and the digit values keyed in by the keys of the keyboard 4 are printed by the printing stage 161.

After multiplier Y and divisor X have been keyed in this manner, and have been recorded by printing in the manner described, the multiplicand A will be keyed in and simultaneously the computing process and the recording process of the result and of the multiplicand a will be effected. A respective key will be depressed, which closes contact 175 and releases the arresting of the key which had closed contact 167.

Contacts 163 and 170 will be closed. Contact 174 will likewise be closed by the key which closes contact 175. The negative pulses entering amplifier 12 as a result of keying in a digit are then conducted to the preadjusted counting tube system 3 through the then closed contact 163. The positive pulse delivered to output lead 14, which terminates the delivery of pulses through amplifier 12, will be fed to the flip flop 18 through the then closed switch 170 and it thereby effects the cycle of the above described computing process.

A positive pulse arising at output lead 14 of the counter 5 ignites this glow discharge stage 172 in the manner described above and thereby effects a record of numerical values stored in counting tube system 160 by the printing stage 161.

The negative pulses, which are introduced into the counting tube system 160 are fed to the input lead of the counting tube stage 32, through the then-closed contact 175. This will thereby be counted through to its zero position and effects printing of the numerical value stored there by the printing stage 42. The positive pulse arising at output lead 156 which effects the print by printing stage 42, will be conducted through lead 178 to the input lead 22¹ and of the flip flop 22 and thereby effects a continuation of the counting process described above.

As described therefore there is keyed in at each time one digit of the multiplicand as this digit may influence the result of the preceding computing part and the result of the preceding computation will be printed. After terminating the print the computing process described above with reference to FIG. 2 will be constantly continued and the result of this computing part of the process will be stored in the same counting tube in which had also been stored a result of the preceding computing part of process.

The next following digit will then also be keyed in and the printing or record process described above will be repeated. A remainder of the preceding computation will be printed also, and this is effected by closing contact 179 by a corresponding key and by thereby switching the switch 180 from its switching position a to switching position b, so that the positive pulse generated thereby ignites the gas discharge stage 172 and the delivery of a pulse from lead 173 through the then-closed contact 179 takes place to the input lead 3¹ of counting tube system 3. The output process of recording takes place in the manner described above with reference to FIG. 2. The actuation of the contact 179 and of the switch 180 takes place for each denomination of the remainder to be recorded, whereby also input lead 3¹ will be advanced stage by stage by switching means which are in counting tube systems 3 and effect thereby a digitwise record of the remainder stored in counting tube system 3.

The computing process differs from the one described above with reference to FIG. 2 only by the fact that flip flop 22 will not be switched over by the positive pulse at output lead 21 of the counting tube system 3 in order to make amplifier 24 operative. The flip flop 22 will be switched over by a positive pulse which is delivered through the output lead of the counting tube system 32 to print a record of digit values stored there. Pulses entering the counting tube system 3 through contact 163 also enter counting tube system 160 through diode 176, through the input lead of the said counting tube system, and adjust respectively the count of the respective keyed-in values.

Where a combination of single-stage tubes is described, and multi-stage tubes as in FIGS. 4a and 4b, adjustment of the total capacity as in FIGS. 5a to 5c may be effected by connecting the respective leads 96a¹⁻¹⁰ or 99a⁰⁻⁹ to one or another of the input or output leads of the single stages 78, 79, 80 of FIG. 4a or 83, 84, 85 of FIG. 4b by adjustable connections.

It is evident that the counting chains shown as single-stage arrangements in FIGS. 4a and 4b may be replaced by chains operative according to a binary count for dealing with combination signals, and furthermore it is understandable that also the multi-stage tubes of FIGS. 4a and 4b could be controlled in an adjustable manner according to the selective design described in detail with reference to FIGS. 5a and 5b.

Any other type of bi-stable element may be used for the bi-stable elements of FIGS. 4a and 4b, for example bi-stable elements in the form of magnetic cores connected in a chain.

What I claim is:

1. An electronic calculating device for calculating a check symbol for a number, the check symbol being equal to the remainder obtained from dividing said number by a prime number, including a control storage; input means operable to set the control storage successively to represent the successive digits of a number; a final counter operable by input pulses applied thereto, said final counter performing a complete cycle of operation in response to the application thereto of a number of input pulses equal to said prime number; a multiple signal control unit; first setting means responsive to each setting of the control storage to represent a digit to set the multiple signal control unit to represent the same digit; second setting means responsive to each setting of the multiple signal control unit to represent a digit to render it effective to generate a number of pulses equal to ten times the digit represented by said unit; and means for applying the pulses generated by the multiple signal control unit as input pulses to said final counter.

2. Apparatus as claimed in claim 1, further comprising a pulse source; means for applying the pulses from said pulse source to said control storage, to said multiple signal control unit and to said final counter; and means controlled by said multiple signal control unit and operative to apply a pulse to said control storage each time the said multiple signal control unit registers a predetermined value.

3. Apparatus as claimed in claim 1, wherein said input means includes a keyboard provided with a group of digit representing key operable to enter said first mentioned number, electrical contacts operable by said keys, and means controlled by said electrical contacts and operable by the depression of a digit representing key to generate a train of electrical pulses equal in number to the digit value represented by the depressed key and means to apply the pulses generated by the contact controlled means to said control storage.

4. Apparatus as claimed in claim 3, further comprising counter means settable by an operated digit representing key contact to the complement of said digit; a source of pulses; signal gating means connecting said pulse source to said counter means and said final counter; means responsive to the operation of a digit representing key to render said signal gating means operative; and means responsive to the registration of a predetermined value by said counter means to render said gating means inoperative.

5. Apparatus as claimed in claim 3, further comprising a plurality of quotient digit registering devices; carry means operative to generate a carry signal in response to said final counter reaching a predetermined value registration; and distributing means operative to apply said carry signals from said final counter to said registering devices in turn.

6. Apparatus as claimed in claim 5, further comprising a plurality of digit value recording devices; and means operable to generate control signals for said recording devices in response to the settings of said quotient digit registering devices and said final counter.

7. An electronic calculating device including input means settable successively to represent the successive digits of a number; a control storage; means interconnecting said input means and said control storage and responsive to the setting of the said input means to represent a digit to set the control storage to represent that digit, said input means including counter means; a pulse generator; a final counter; a multiple signal control unit; first signal gating means responsive to the setting of said input means to apply pulses from said pulse generator to said control means and to said final counter; means in said counter means responsive to said applied pulses to apply a first control pulse, representative of the stored digit, to said first gating means to render it inoperative; second gating means rendered operative by said first control pulse to apply pulses from said pulse generator to said final counter and to said control storage; means responsive to the registration of a predetermined count by said final counter to generate a second control pulse; means to apply said second control pulse to said second gating means to render the said second gating means inoperative; third signal gating means rendered operative by the second control pulse to apply pulses from said pulse generator to said final counter and to said multiple signal control unit; means responsive to the registration of a predetermined count by said multiple signal control unit to apply a pulse to said control storage; and means responsive to the registration of a predetermined count by said control storage to apply a pulse to said third gating means to render it inoperative.

8. An electronic calculating device for performing combined multiplication and division by predetermined first and second factors respectively of a number entered digit by digit, including a control storage; means operable to set the control storage sequentially to represent the successive digits of said number; a multiple signal control unit; means responsive to each setting of the control storage to set said multiple signal control unit in accordance with the digit represented by the setting of said control storage; a final counter operative by pulses applied thereto to generate a carry pulse after the application of a number of pulses equal to said second factor; means responsive to the setting of said multiple signal control unit and controlled thereby to generate a number of pulses equal to the product of said first factor and the complement of the digit to which the multiple signal control unit has been set and to apply such pulses to said final counter; and output counting means responsive to carry signals from said final counter; whereby said output counting means and said final counter are set to register the result of the combined multiplication and division of said number.

9. Cyclically operating calculating apparatus operable to perform a combined multiplying and dividing operation on an entered number including a final counter having a counting capacity equal to the factor by which the entered number is to be divided; number input means operable to apply to said final counter in each cycle a number of pulses equal to one digit of said number to register such digit therein, the digits of said number being entered in order of decreasing significance; first control means settable in response to such input of a digit into said final counter; a control storage; second input means operable, under control of said final counter and in response to the setting of said first control means, to apply to said control storage a number of pulses equal to the complement of the digit registered by said final counter to register such complement value in said control storage; second control means settable in response to the registration of each digit by said final counter; pulse train generating means rendered operative by the setting of said second control means to apply a sequence of pulses to said control storage and to apply to said final counter a number of pulses, equal to the factor by which the entered number is to be multiplied, for each pulse applied to said control storage; means responsive to the registration of a predetermined count by said final counter to render said second control means inoperative; carry means operative to generate a carry signal in response to said final counter registering a predetermined count; and quotient value registering means responsive to the carry signals generated by said carry means.

References Cited in the file of this patent

UNITED STATES PATENTS 2,528,100   Williams _____ Oct. 31, 1950

(Other references on following page)

UNITED STATES PATENTS

| | | |
|---|---|---|
| 2,575,331 | Compton | Nov. 20, 1951 |
| 2,684,199 | Starreveld | July 20, 1954 |
| 2,692,728 | Strickler | Oct. 26, 1954 |
| 2,696,572 | Schmid | Dec. 7, 1954 |
| 2,754,054 | Helmig | July 10, 1956 |
| 2,755,022 | Knutsen | July 17, 1956 |
| 2,768,348 | Grumet | Oct. 23, 1956 |
| 2,759,669 | Knutsen | Aug. 21, 1956 |
| 2,774,534 | Dunn | Dec. 18, 1956 |
| 2,810,099 | Townsend | Oct. 15, 1957 |
| 2,833,941 | Rosenberg | May 6, 1958 |
| 2,837,278 | Schreiner | June 3, 1958 |

FOREIGN PATENTS

| | | |
|---|---|---|
| 747,870 | Great Britain | Apr. 18, 1956 |